United States Patent [19]

Borowski

[11] 4,189,183
[45] Feb. 19, 1980

[54] MINING MACHINE WITH CUTTER DRUMS AND SENSING APPARATUS

[75] Inventor: Karl-Heinz Borowski, Bochum, Fed. Rep. of Germany

[73] Assignee: Gebr. Eickhoff, Maschinenfabrik und Eisengiesserei m.b.H., Bochum, Fed. Rep. of Germany

[21] Appl. No.: 931,644

[22] Filed: Aug. 7, 1978

[30] Foreign Application Priority Data

Jul. 23, 1977 [DE] Fed. Rep. of Germany ....... 2733405

[51] Int. Cl.² .............................................. E21C 39/00
[52] U.S. Cl. ........................................... 299/1; 175/50
[58] Field of Search ....................... 299/1; 175/39, 50; 73/85

[56] References Cited

U.S. PATENT DOCUMENTS

| 2,620,386 | 12/1952 | Alspaugh et al. | 299/1 X |
| 3,550,959 | 12/1970 | Alford | 299/1 |
| 4,079,795 | 1/1976 | Sackmann et al. | 299/1 |

FOREIGN PATENT DOCUMENTS 1203362  8/1970  Fed. Rep. of Germany .............. 299/1

Primary Examiner—Ernest R. Purser
Attorney, Agent, or Firm—Thomas H. Murray; Clifford A. Poff

[57] ABSTRACT

A drum cutter for a mining machine includes spaced-apart pick elements projecting radially therefrom and a disc forming part of a sensing apparatus disposed to follow a preceding one of the pick elements through rotational movement of the drum cutter. A disc is mounted by a pivot pin extending generally parallel with the rotational axis of the drum cutter. A sensor responds to the radial loading on the disc and produces a signal delivered to a controller for an actuator coupled to a pivot arm carrying the drum cutter. The disc is mounted to project radially about 10–20 millimeters beyond the radially-projected distance by a pick element. The sensor is a strain gage, a piezoelectric gage, an induction gage, a capacitive gage or a load cell. The sensor may be mounted within a hydraulically-power piston and cylinder assembly forming the actuator for the pivot arm. When a load cell is used, it filters out and detects pressure variations at peak magnitudes occurring as the disc penetrates the mine face with a rhythmic rotation for producing corresponding electric signals that are delivered to the controller for the pivot arm.

10 Claims, 4 Drawing Figures

MINING MACHINE WITH CUTTER DRUMS AND SENSING APPARATUS

BACKGROUND OF THE INVENTION

This invention relates to a sensing apparatus, and more particularly to such an apparatus for underground drum cutter mining machines having cutter drums with at least a sensing member projecting radially beyond a fixed pick element positioned at an advanced position from the sensing member such that the sensing member undergoes radial loading and produces a corresponding signal for use by a control to respond to radial movements of the tool and to determine the height through which the cutter drum is provided.

West German Patent No. 1,173,049 discloses a drum cutter for use in winning operations, opening out operations and drifting operations in minerals, particularly the coal and surrounding rock. The cutter drums are provided with toothed striking rollers on the periphery of the drum for operative use in both directions of rotation by the cutter drum. The toothed striking rollers are rotatably mounted with their axes parallel to the roller axes or askew thereof. The toothed rollers are carried by holders on the drum at laterally, spaced-apart locations in a ring or spiral pattern.

West German Patent No. 521,979 discloses the use of a fork to rotatably mount a disc forming a roughing or marking cutter for association with a cutting pick. The object of this construction of parts is to break out the mineral which has been marked by the roughing or marking cutter by means of the pick which contacts the mineral after the marking cutter and thereby reduces the formation of dust.

Other mining machines known in the art include devices to provide a continuous indication of the position of a rotary cutter head relative to the various layers of ore while the cutting head is performing the material releasing operations. More specifically, such a device as shown in West German Patent No. 916,043 provides a testing or detecting tooth resiliently mounted in a rubber sleeve in the cutter head for use when making the starting cut in the layers of ore. The testing or detecting tooth is connected to a pressure detector which converts the test-tooth pressure variations into electrical signals which are, in turn, displayed relative to polar coordinates on an image screen of a cathode-ray oscillograph. The pressure detector is designed to respond to substantially only the vibrations produced during cutting by the pressures imposed on the test tooth. The pressure detector changes resistance at cadence of the vibration and, through the agency of the oscillograph, provides a visual indication corresponding to the frequency and amplitude of the test-tooth vibrations which are used to control the cutting head.

West German Patent No. 1,939,956 discloses a device for indicating the hardness of the ore during the extraction process with a rotating cutting device of a mining machine. The hardness indicator is associated with the rotating cutting device wherein the indicator comprises a sensing pick or the like resiliently mounted in a holder that includes means to respond to movements of the sensing pick as produced by variations in the ore hardness. Electrical signals produced by the hardness indicator are used to control the height of the cutter drum. The sensing pick is disposed after and close to a fixedly-mounted pick so that the sensing pick remains in a constant depth within the ore during the removal process. Such a device provides satisfactory measured values only when the cutting edge of the pick is sharp but the measured values become inaccurate when the cutting edge has become blunt or broken either after prolonged use or because of heavy stressing of the cutting edge by the rock surrounding the ore seam.

SUMMARY OF THE INVENTION

It is an object of the present invention to provide an improved sensing mechanism which is constructed in such a manner so as to render the sensing mechanism insensitive to peaks to the cutting force which occur when the load contacting surface penetrates the surrounding rock.

More particularly, according to the present invention, there is provided a sensing apparatus in combination with a drum cutter mining machine which includes a controller for an actuator coupled to a pivot arm carrying a driven drum cutter and having spaced-apart pick elements projecting radially therefrom for releasing material from the working face of an underground mine, the sensing apparatus including a sensor having a disc disposed to follow the cutting plane of a preceding one of the pick elements through rotational movement by the drum cutter, the sensor being coupled to deliver a signal to the controller, and mounting means including a pivot pin extending generally parallel with the rotational axis of the drum cutter to mount the disc for radial loading.

Thus, according to the present invention, there is provided a sensing apparatus wherein a sensing disc is mounted by a pivot pin disposed in a generally parallel relation to the rotational axis of the cutter drum and within the plane of movement by a leading one of the pick elements. Discs are used for drifting roads and for drilling bore holes as well as for breaking out very hard cores. Disc elements have a long working life since they have long edge lives which are unaffected due to stressing by very hard ores. Therefore, such discs retain their full cutting ability even after prolonged use and their employment in the sensing apparatus of the present invention insures measured values which are required purely as a result of the radial component of the reaction force acting on the discs despite the fact that the discs are in prolonged contact with the rock surrounding an ore seam and despite the severe stressing by the ore which accompanies the seam. The edge life of a disc is several times longer than the edge life of a normal coal pick and the disc is, therefore, particularly suitable for continuous operation and, hence, also satisfactory for use as a level control for a cutter drum.

It is particularly convenient to arrange the disc to project about 10–20 millimeters radially beyond the projected radial distance of a preceding pick. The disc is disposed after the pick on the cutting drum in a closely-spaced relation so that the disc always contacts a chip of constant thickness which produces measured values that differ as the hardness of the chip varies. The measured values are transmitted as telemetry signals to a control mechanism used to adjust the height of the cutting tool so that the control energizes the height control mechanism and returns the cutting tool back to the mine seam.

Evaluation of the measured values by the sensing apparatus must be suppressed in a dependent relation upon the angle of rotation by the cutter drum to insure that the drum does not fail to remove wanted material from the mine seam. The reaction force acting upon the disc is detected by means such as a strain gage or a piezoelectric gage. Alternatively, the reaction force acting on the disc is detected inductively or capacitively. Since the relationship between strengths or hardness of coal and surrounding rock is of the order of the ratio of 1:3, all measured values found directly by means of the disc in the sensing apparatus that exceed a predetermined measured value correspond to the cutting force of the disc working in coal and can be used to correct the height of the cutting tool.

It is very advantageous to provide that the reaction force on the disc is detected through a sensing device arranged within the actuator or adjusting device for the support arm and used to control the arm. This feature obviates the constructional outlay required for transmitting measured values from the disc to the adjusting device for the support arm. Therefore, according to the present invention, it is preferred to detect pressure variations in the hydraulic system for the support arm adjusting device. By means of a load cell or the like, peak pressures originating at the rhythm of rotation of the cutting drum as the disc penetrates into the surrounding rock are filtered out for controlling the adjusting device for the support arm, typically in the form of a hydraulically-powered piston and cylinder assembly.

These features and advantages of the present invention as well as others will be more fully understood when the following description is read in light of the accompanying drawings, in which.

Figure 1:
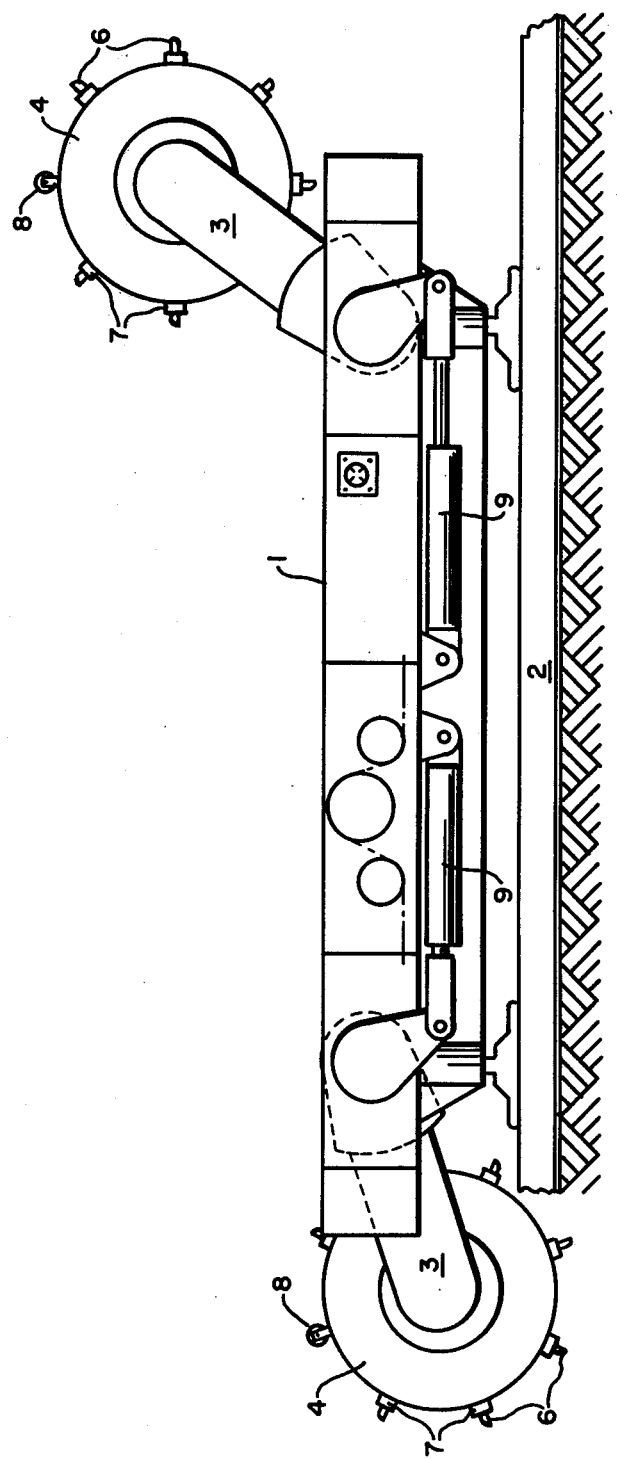
FIG. 1 is a side elevational view of a drum cutter mining machine incorporating the features of the present invention.
Figure 2:
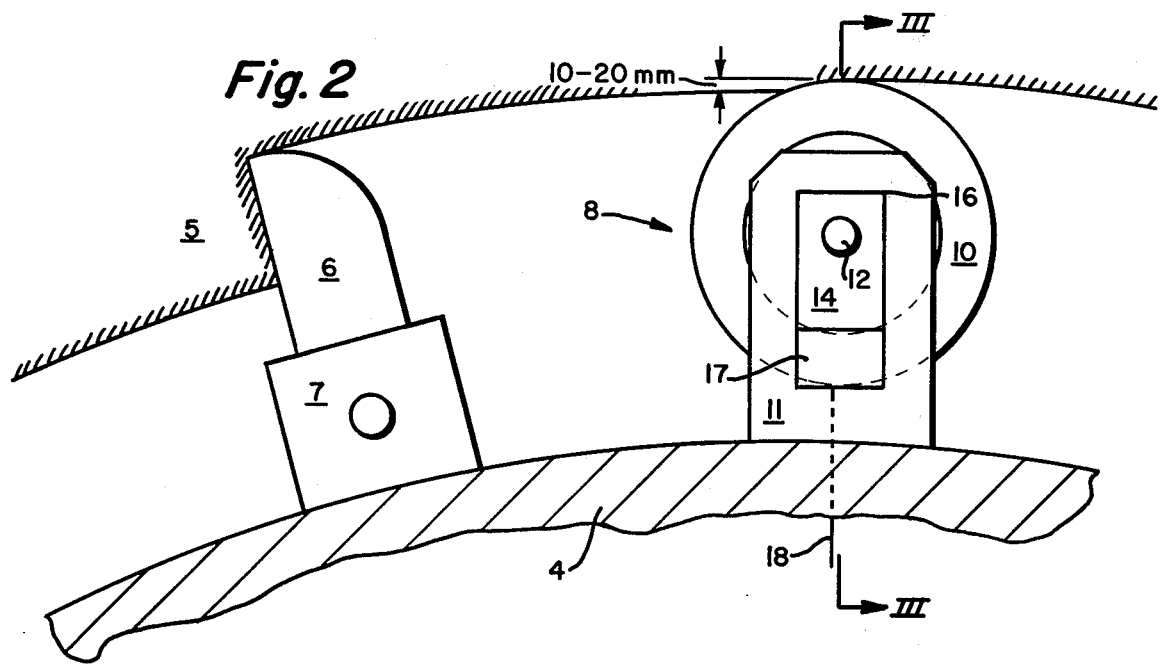
FIG. 2 is an enlarged view illustrating a portion of the cutting drum carrying a pick element in relation to the sensing apparatus of the present invention.
Figure 3:
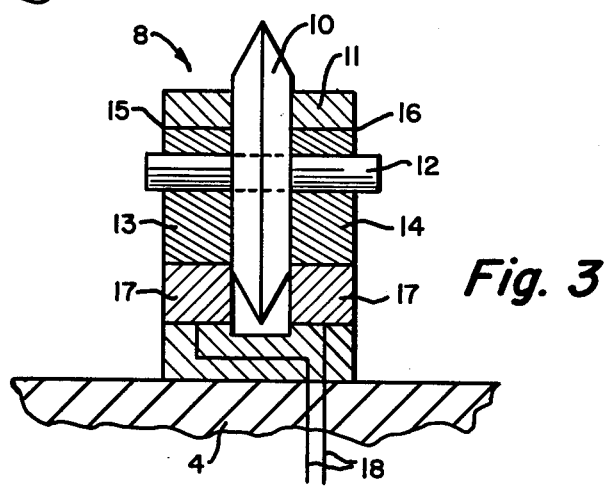
FIG. 3 is a sectional view taken along line III—III of FIG. 2.

In FIG. 1, reference numeral 1 denotes a drum cutter mining machine. The mining machine is adapted to move along a longwall face conveyor 2. In FIGS. 1 and 2, pivotally mounted support arms 3 each carries a cutter drum 4 that is rotated by a drive in a manner well known in the art to release material from a mine seam 5. Cutting picks 6 are fixedly mounted in holders 7 which are, in turn, secured at spaced-apart locations on the periphery of each of the cutting drums 4. A sensing apparatus of the present invention includes a sensing device 8 arranged on the periphery of each of the cutting drums. As the sensing device 8 passes into contact with the surrounding rock at the mine face, an abrupt and substantial increase in the reaction force is imposed on the sensing device which, in turn, delivers an output signal to correct the adjustable height of arms 3 through an appropriate actuation of an associated servo actuator such as piston and cylinder assembly 9. In this way, the cutting drum 4 is returned back into the mine seam 5.

As clearly shown in FIG. 2, the sensing device 8 comprises a disc 10 mounted for rotation upon a pin 12 defining a rotational axis for the disc that extends in a generally parallel relation to the rotational axis of the cutter drum. The pin 12 is mounted in slide blocks 13 and 14 located within window openings 15 and 16 formed within a holder 11. The holder 11 is disposed at a relatively close location but after one of the advancing pick holders 7. The holder 11 retains the disc 10 for displacement by the cutter drum within a plane of movement by the preceding pick element 6 so that the disc 10 projects radially by a distance of approximately 10-20 millimeters beyond the radially-projected distance of the pick. This feature insures that the depth of penetration by the disc 10 into the ore always remains limited to a constant amount and the reaction force acting on the disc occurs as a result of contact by the disc with the essentially same ore segment that was just prior thereto in contact with the pick so that the reaction force acting on the disc is substantially the same value as the reaction force acting on the pick.

The slide blocks 13 and 14 have bottom end faces that bear upon load cells 17 or the like. The load cells are in the form of strain gages or piezoelectric, inductive or capacitive measuring devices in systems which respond to the radial pressure acting on the disc 10. Lines 18 deliver the output electrical signals from the load cells 17 to a controller for each of the hydraulically-powered piston and cylinder assemblies 9. In this way, the piston and cylinder assemblies are actuated to, in turn, displace the cutting drum 4 back into the seam 5.

Figure 4:
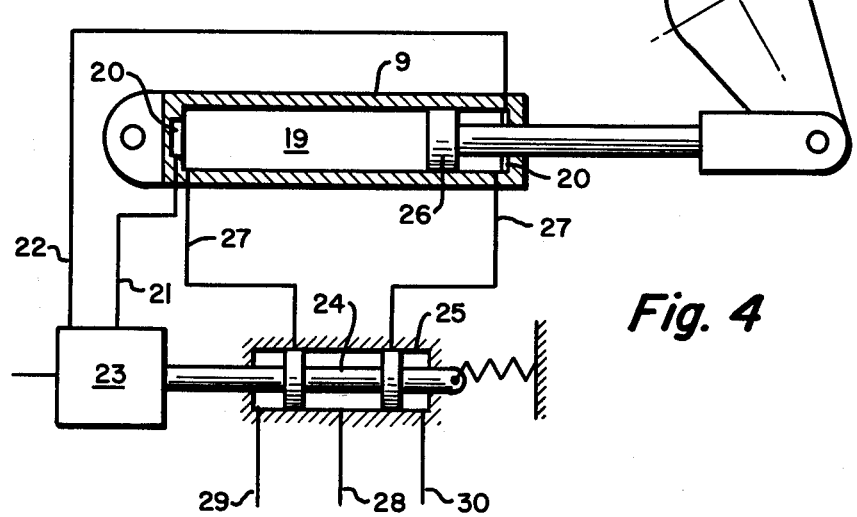
FIG. 4 is a diagrammatic view of the adjusting device for a support arm incorporating a second and preferred embodiment of the sensing apparatus.

In accordance with the embodiment of the invention shown in FIG. 4, the reaction force imposed by the ore upon the disc 10 due to its relative position is detected within the adjusting device for the support arm, that is, the servo operated piston and cylinder assembly 9 which is used to control the position of the support arm. In this construction of parts, the piston and cylinder assembly 9 includes one load cell 20 or the like located at a position in the end face to its bore 19. The load cell is connected by lines 21 and 22 to a control 23. The function of the control 23 includes the filtering of the output signals from the load cell 20. These signals are proportional to the pressure variations to the hydraulic fluid. The useful signals from load cell 20 are produced at cadence of rotation by the cutter drum 4 as the disc 10 enters the surrounding rock. Such signals are used to actuate a controller which forms part of the control 23 and has an output that acts upon a spool 24 of a valve 25. The spool 24 is retained at a nominal position through the use of a spring 27. The pressure variations to the hydraulic fluid can, of course, be filtered out directly by the load cell 20. In this event, the load cell is designed to respond only to pressure loads such as those loads which occur when the disc 10 enters the surrounding rock. The radial loads imposed on the disc by the surrounding rock are about two or three times greater than the radial force imposed on the disc upon contact with the mine seam 5. In both cases, the control 23 responds to move piston 26 of the piston and cylinder assembly 9 in a direction to return the drum cutter 4 back into the seam. To this end, the chambers at both sides of the piston in cylinder bore 19 communicate by way of lines 27 with valve 25. The valve receives pressurized hydraulic fluid from line 28 and depending upon the position of its spool 24, it connects line 28 to one side or the other of piston 26. The side of the cylinder 9 which is not supplied with fluid is connected by way of line 29 or 30 to a sump, not shown.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A sensing apparatus in combination with a drum cutter mining machine which includes a controller for an actuator coupled to a pivot arm carrying a driven drum cutter having spaced-apart pick elements projecting radially therefrom for releasing material from the working face of an underground mine, said sensing apparatus including a sensor having a disc disposed to follow a preceding one of said pick elements through rotational movement by said drum cutter, said sensor being coupled to deliver a signal to said controller, and mounting means including a pivot pin extending generally parallel with the rotational axis of said driven drum cutter to mount said disc for radial loading.

2. The combination according to claim 1 wherein said mounting means supports said disc to project between 10–20 millimeters radially beyond the projected radial distance of the preceding one of said pick elements.

3. The combination according to claim 1 wherein said sensor includes a strain gage.

4. The combination according to claim 1 wherein said sensor includes a piezoelectric gage.

5. The combination according to claim 1 wherein said sensor includes an induction gage.

6. The combination according to claim 1 wherein said sensor includes a capacitive gage.

7. The combination according to claim 1 wherein said sensor is supported within said actuator to respond to the reaction force imposed upon said disc by contact with the working face of an underground mine.

8. The combination according to claim 7 wherein said actuator includes a hydraulically-powered piston and cylinder assembly.

9. The combination according to claim 8 wherein said sensors include a load cell to filter out and detect pressure variations at peak magnitudes occurring as said disc penetrates the mine face with the rhythmic rotation of said cutter drum for producing corresponding electrical signals.

10. The combination according to claim 9 wherein said controller receives the electrical signals from said load cell.

* * * * *